E. MARTIN.
ANIMAL FEEDING MECHANISM.
APPLICATION FILED AUG. 28, 1913.
1,175,788.
Patented Mar. 14, 1916.
2 SHEETS—SHEET 1.
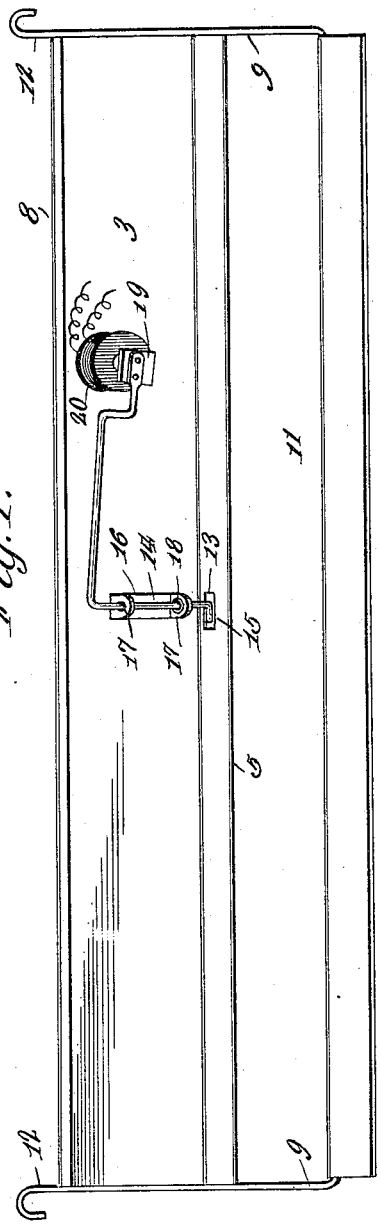
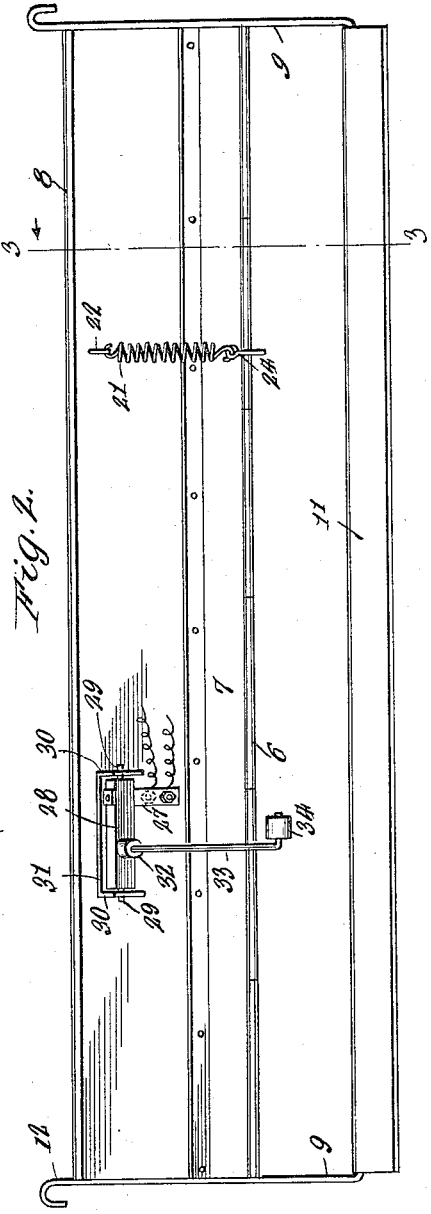

E. MARTIN.
ANIMAL FEEDING MECHANISM.
APPLICATION FILED AUG. 28, 1913.
1,175,788.
Patented Mar. 14, 1916.
2 SHEETS—SHEET 2.
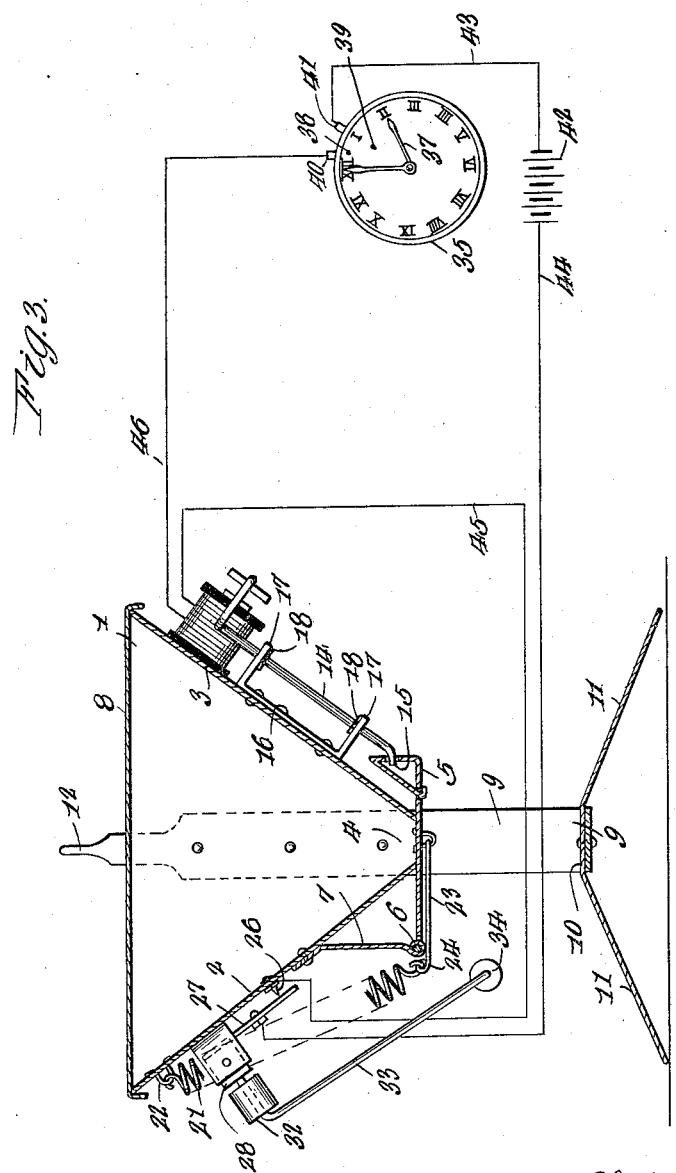

UNITED STATES PATENT OFFICE.

ELECTUS MARTIN, OF HUGUENOT, NEW YORK.

ANIMAL-FEEDING MECHANISM.

1,175,788.  Specification of Letters Patent.  Patented Mar. 14, 1916.

Application filed August 28, 1913. Serial No. 787,171.

*To all whom it may concern:*

Be it known that I, ELECTUS MARTIN, a citizen of the United States, residing at Huguenot, in the county of Orange and State of New York, have invented certain new and useful Improvements in Animal-Feeding Mechanisms, of which the following is a specification.

This invention relates to animal feeding mechanism and has for its object the provision of a receptacle for the feed and automatic means for releasing the feed held by the receptacle at a predetermined time.

In the most improved embodiment of the invention the feed is released by improved electrical means, and I preferably employ a clock as a circuit closer to energize the means for the release of the food held by the receptacle.

A further object of the invention is to provide an improved form of spreader upon which the released feed is discharged so that when the device is used for feeding chickens it will be spread and distributed so as to prevent over-crowding and congestion and will permit all of the chickens to obtain a portion of the feed.

A still further object is to provide an effective form of releasing element which will hold the parts securely in the closed relation when moved to its locking position, and a still further object is to provide a simple and effective form of make and break device so as to economize the use of the current and prevent the circuit being closed during the time that the clock is passing from a circuit closing to a circuit opening position.

Other features and objects of the invention will be more fully described in connection with the accompanying drawings and more particularly pointed out in and by the appended claims.

In the drawings: Figure 1, is a view in side elevation of an embodiment of my invention in which the feed receptacle is in the form of a trough. Fig. 2, is a view in elevation looking from the opposite side. Fig. 3, is a sectional view on line 3—3 of Fig. 2 with the circuit diagrammatically shown.

Like characters of reference designate similar parts throughout the different figures of the drawings.

As illustrated, 1, designates a trough shaped body having inclined sides 2 and 3, which converge toward each other but which do not meet, thereby forming a feed discharge slot 4. A feed releasing means in the form of a door 5, is shown hinged at 6, to a bracket 7, the latter being fixed to the side 2, of the trough. A cover 8, is provided so that when the feed is disposed in the trough it will be protected, for an obvious reason. The trough is mounted at its ends upon uprights 9, and the latter are preferably connected to a spreader 10, having oppositely disposed deflecting or inclined spreading portions 11. If the feeder is disposed upon a floor space it may be supported by the spreader. However, I provide suspension hooks 12, on the uprights 9, so that the device may be suspended above a floor space or above the ground surface.

The door 5, is provided with one member of a trip device which may consist of an elongated opening 13. The other member of said trip device may comprise a rod 14, having a cranked or trip end 15, adapted upon rotation of the rod to move out of engagement with the upper wall of the opening 13, to release the door 5, or to be moved into engagement therewith to lock the door 5, in the closed position shown. The rod 14, is rotatably mounted in a bracket 16, which is secured to the side 3, of the trough 1, and which is provided with bearing arms 17, in which the rod 14, is journaled. Cotter pins 18, may be provided for preventing longitudinal movement of the rod 14, in its bearings. The upper end of the rod 14, is cranked and terminates in an armature 19, adapted to be attracted by a magnet 20.

While the weight of the feed on the door 5, will normally act to open the same when it is unlocked, I provide spring opening means for the door which will not only insure opening movement thereof, but which will open the same to a position such as will permit free discharge of the feed upon the spreader without any possible interference from the door. As shown, an opening spring 21, is secured at 22, to the side 2, of the trough at one end of the spring, and the other end is connected with a link or wire 23, as indicated at 24. The link 23, is connected with the door 5. By reason of the action of this spring and the manner in which the same is connected with the door, with respect to the hinge 6, it will readily be seen that the spring will swing the door to a full or wide open position, and this opening movement of the door performs an additional function which will be presently described.

A make and break device is provided which is preferably located on the feeding receptacle or trough and which consists of a contact 26, directly mounted on the trough and suitably insulated therefrom as shown. The other contact is indicated at 27, and is hingedly mounted preferably upon a piece of insulating material which may consist of a block of wood 28. The hinged mounting 28, may be provided with trunnions 29, having bearings in arms 30, of a bracket 31. A weight 32, normally acts to hold contacts 27 and 26 in engagement with each other and the weight is mounted upon a rod or throw out arm 33, which is secured to the insulating mounting 28. The throw out arm 33, is provided with a roller 34, which lies in the path of the door 5, so that when the latter swings into an open position it will engage the roller 34, and rock the hinged mounting 28, to disengage the contact 27 from contact 26.

Means are provided for closing the circuit to energize the magnet 20, and release the door 5, from a locked or closed position. As shown, said means may consist of a clock 35, with minute and hour hands 36 and 37, respectively, which may in any suitable manner engage minute and hour contacts 38 and 39. The minute and hour contacts may be provided on the face of the clock for each hour time division thereof and may be suitably connected with sockets into which plugs 40 and 41, may be inserted. The plug 41, is connected with one pole of a source of current 42, by means of a wire 43. The other pole is connected by a wire 44, with the contact 27. Contact 26, is connected by wire 45, with one terminal of the magnet 20, and the other terminal thereof is connected by wire 46 with plug 40.

It will be seen that contacts 26 and 27, will normally be engaged to close the circuit but that the circuit will normally be opened except when the minute and hour hands engage the respective minute and hour contacts 38 and 39, in accordance with the position in which the plugs 41 have been inserted. Immediately upon closing of the circuit by the minute and hour hands, the magnet 20, will be energized to actuate the trip device 13 and 15, and release the door 5, under the weight of the feed and the action of spring 21. Outward swinging movement of the door 5, will engage the roller 34, and positively swing contact 27, out of engagement with contact 26, thereby immediately opening the circuit after initial closing of the circuit has performed its function, thereby preventing waste of electrical energy.

While I have herein shown and described one specific form of my invention I do not wish to be limited thereto except for such limitations as the claims may import.

I claim:

1. In a feeding mechanism, a feed receptacle provided with an open bottom, a door for closing said bottom, electrically-actuated means to control the opening of said door, a circuit in which said electrically actuated means is connected to be operated as the circuit is energized, a make and break device connected in said circuit apart from said electrically-operated means to be mechanically normally held in a closed relation, and said mechanical means depending from the make and break mechanism into the path of movement of the door to be engaged thereby in the opening swing and to move said make and break device to the circuit opening relation.

2. In an automatic feeding mechanism, a receptacle for the feed, a door for controlling discharge of the feed from said receptacle, a circuit, trip means including a magnet connected in said circuit for holding the door in a closed position, a make and break device connected in said circuit to be independent of said door and adapted to mechanically move to a closed relation, and a portion of the mechanism of said make and break device arranged to be engaged by the door in the open relation to throw said device to a circuit-opening position.

3. In an automatic feeding mechanism, a receptacle for the feed, a door for controlling discharge of the feed from said receptacle, a spring normally acting to move said door into a full open position, a circuit and a source of supply of current, trip means for holding said door in a closed position and including a magnet connected in said circuit, a make and break device connected in said circuit mounted to be independent of said door and to be normally held in a closed relation, and a portion of the mechanical structure of said device depending into the path of movement of said door in swinging to its open position and thus causing actuation of said device to break the circuit upon swinging of the door to the open position.

4. In an automatic feeding mechanism, a feed receptacle having a discharge opening, a door positioned to close said discharge opening, mechanical means to be brought to a position to normally hold said door in a closed relation, electrical means to bring said mechanical means to an inoperative relation and thus permit the door to open, a circuit for said electrically-actuated means, a make and break device carried by said feed receptacle apart from the door and connected in said circuit, mechanical means in the form of a weighted arm depending from said make and break device and adapted to normally hold the parts thereof in a closed relation, and all of said parts so arranged that upon energization of said circuit through the operation of the time-controlling apparatus the mechanical door-retaining means is made inoperative permitting the door to swing to the open relation and the weighted arm of said make and break device is engaged to bring said device to the circuit-opening relation.

5. In an automatic feeding mechanism, a trough-shaped receptacle provided with an open bottom, a door for closing said open bottom, a circuit, a trip device on one side of said receptacle for holding said door in a closed position and including a rotatable trip arm having an armature, a magnet connected in said circuit to attract said armature to rotate said arm, a make and break device on the other wall of said receptacle connected in said circuit, one member of said break device being pivotally mounted on the receptacle, and a weighted throw out arm normally holding the pivoted member of said make and break device in circuit closing contact with its companion member and adapted for actuation by the door to throw said pivoted make and break member into a circuit opening position.

6. In a feeding mechanism, a feed receptacle provided with an open bottom, a door for closing said bottom hinged at a point to normally fall to an open position when released, a door holding means comprising a revolubly mounted rod provided with a trip end at one of its extremities to engage with the door and retain the same when in the closed relation and the opposite end provided with a transversely extending arm, an electric circuit having make and break means therein, an armature carried by said transversely extending arm, electro-magnetic means connected in the circuit to be operated by current passing therethrough to act upon said armature to swing said rod to a relation that the trip arm is moved from its holding position and the door is permitted to open, mechanical means to aid in the opening of said door, and a mechanical make and break connected in the circuit of said electro-magnetic means to normally maintain a closed connection therethrough and to be moved to a position to break the circuit upon engagement of the door therewith when swung to the open position.

7. In a feeding mechanism, a feed receptacle provided with an open bottom, a door for closing said bottom hinged at a point to normally fall to an open position when released, a door holding means comprising a revolubly mounted rod provided with a trip end at one of its extremities to engage with the door and retain the same when in the closed relation and the opposite end provided with a transversely extending arm, an electric circuit having make and break means therein, an armature carried by said transversely extending arm, electro-magnetic means to act upon said armature to swing said rod to a relation that the trip arm is moved from its holding position and the door is permitted to open, a circuit for said electro-magnetic means, a circuit breaker arranged to be normally held in an operative relation connected in one of the wires of said circuit and provided with a line extending in proximity to the door, and said parts so arranged that upon opening of the door the arm is engaged and the parts of the circuit breaker are moved to a relation to break the circuit.

In testimony whereof I affix my signature in presence of two witnesses.

ELECTUS MARTIN.

Witnesses:
W. S. BEVANS,
GEORGE E. MARTIN.

Copies of this patent may be obtained for five cents each, by addressing the "Commissioner of Patents, Washington, D. C."